(12) United States Patent
Paolozzi et al.

(10) Patent No.: US 12,156,629 B2
(45) Date of Patent: Dec. 3, 2024

(54) VEHICLE INTERIOR CLEANING APPARATUS

(71) Applicant: Paolozzi Investments, Inc., Vienna, VA (US)

(72) Inventors: Guy Anthony Paolozzi, Vienna, VA (US); Nicholas Noah Bush, Chagrin Falls, OH (US); Christopher D. Tomko, Butler, PA (US)

(73) Assignee: Confinity Robotics, LLC, Chagrin Falls, OH (US)

( * ) Notice: Subject to any disclaimer, the term of this patent is extended or adjusted under 35 U.S.C. 154(b) by 189 days.

(21) Appl. No.: 17/085,643

(22) Filed: Oct. 30, 2020

(65) Prior Publication Data

US 2021/0137334 A1 May 13, 2021

Related U.S. Application Data

(60) Provisional application No. 62/934,712, filed on Nov. 13, 2019, provisional application No. 62/934,084, filed on Nov. 12, 2019.

(51) Int. Cl.
*A47L 9/08* (2006.01)
*A47L 5/14* (2006.01)
*A47L 9/06* (2006.01)

(52) U.S. Cl.
CPC ...... *A47L 9/08* (2013.01); *A47L 5/14* (2013.01); *A47L 9/0673* (2013.01); *A47L 2201/00* (2013.01)

(58) Field of Classification Search
CPC ............. A47L 5/14; A47L 9/08; A47L 9/0673
USPC ...................................... 15/345, 399; 134/21
See application file for complete search history.

(56) References Cited

U.S. PATENT DOCUMENTS

| | | | | |
|---|---|---|---|---|
| 787,389 | A | * | 4/1905 | Morehead ................. A47L 9/08 15/345 |
| 2,494,773 | A | * | 1/1950 | Mead ...................... B24C 3/065 29/DIG. 79 |
| 3,161,900 | A | | 12/1964 | Hanns |
| 3,268,942 | A | * | 8/1966 | Rossan ..................... A47L 9/08 15/346 |
| 3,678,534 | A | | 7/1972 | Hilbig |

(Continued)

FOREIGN PATENT DOCUMENTS

| | | |
|---|---|---|
| DE | 10014834 A1 | 11/2000 |
| DE | 19944115 A1 | 3/2001 |

(Continued)

OTHER PUBLICATIONS

Translation of JP5693050B2 (Year: 2015).*

(Continued)

*Primary Examiner* — Tom Rodgers
(74) *Attorney, Agent, or Firm* — Tucker Ellis LLP

(57) ABSTRACT

A cleaning apparatus for use by hand and/or with a robotic device includes a nozzle that expels fluid, air or liquid, out of an open end of a housing of the cleaning apparatus. Simultaneously, a vacuum device is suctioning debris through the housing and into a vacuum port. The simultaneous use of suction and expelled fluid through a single apparatus generates turbulent airflow and effectively loosens and removes debris attached to surfaces without the need for the housing to contact the surfaces.

22 Claims, 10 Drawing Sheets

(56) References Cited

U.S. PATENT DOCUMENTS

| | | | |
|---|---|---|---|
| 3,963,515 A | | 6/1976 | Haldeman et al. |
| 4,037,290 A | | 7/1977 | Rose et al. |
| 4,300,261 A | | 11/1981 | Woodward et al. |
| 4,333,205 A | | 6/1982 | Woodward |
| 4,751,759 A | * | 6/1988 | Zoell ................ B44D 3/16 15/345 |
| 5,209,028 A | | 5/1993 | McDermott et al. |
| 5,309,683 A | * | 5/1994 | Hockett ............ B24C 3/065 451/92 |
| 5,588,176 A | | 12/1996 | Sixsmith |
| 5,640,739 A | | 6/1997 | Campbell |
| 6,170,758 B1 | | 1/2001 | Lee |
| 8,360,827 B1 | | 1/2013 | Coughtry |
| 2002/0121291 A1 | * | 9/2002 | Daum ................ B60S 3/008 134/123 |
| 2004/0177469 A1 | * | 9/2004 | Sadaune ............ A47L 9/08 15/322 |
| 2005/0023377 A1 | | 2/2005 | Kawamoto |
| 2007/0151069 A1 | | 7/2007 | Kothrade |
| 2007/0180650 A1 | | 8/2007 | Gabara |
| 2008/0295864 A1 | | 12/2008 | Turner |
| 2011/0108066 A1 | | 5/2011 | Holtby |
| 2015/0000705 A1 | | 1/2015 | Dehn |
| 2015/0040342 A1 | | 2/2015 | Henderson |
| 2015/0101144 A1 | | 4/2015 | Bosses |
| 2015/0239020 A1 | | 8/2015 | Ponomarev |
| 2023/0159233 A1 | | 5/2023 | Hasegawa |

FOREIGN PATENT DOCUMENTS

| | | | |
|---|---|---|---|
| EP | 0743097 A1 | | 11/1996 |
| EP | 1649942 A1 | | 4/2006 |
| EP | 2355685 B1 | | 8/2015 |
| GB | 2035787 A | | 6/1980 |
| GB | 2138280 A | | 10/1984 |
| GB | 2367871 A | | 4/2002 |
| GB | 2411823 A | | 9/2005 |
| JP | 2005261878 A | | 9/2005 |
| JP | 3778777 B2 | | 5/2006 |
| JP | 2011024645 A | | 2/2011 |
| JP | 5693050 B2 | * | 4/2015 |
| KR | 20080015956 A | | 2/2008 |
| KR | 101256625 B1 | | 4/2013 |
| KR | 101475259 B1 | | 12/2014 |
| WO | 2010065115 A2 | | 6/2010 |

OTHER PUBLICATIONS

International Search Report & Written Opinion issued in corresponding application No. PCT/US2020/059631 dated Feb. 4, 2021, 16 pages.

Supplementary European Search Report of corresponding European Application No. 20886853.9, dated Jul. 2, 2024, 9 pages.

* cited by examiner

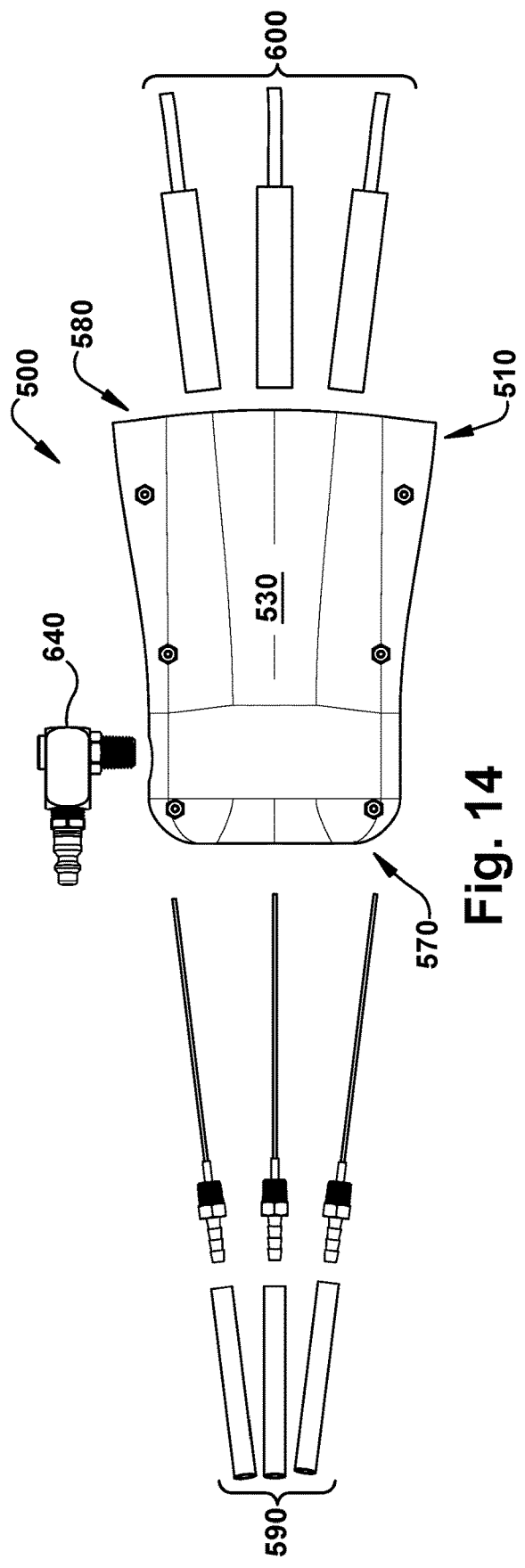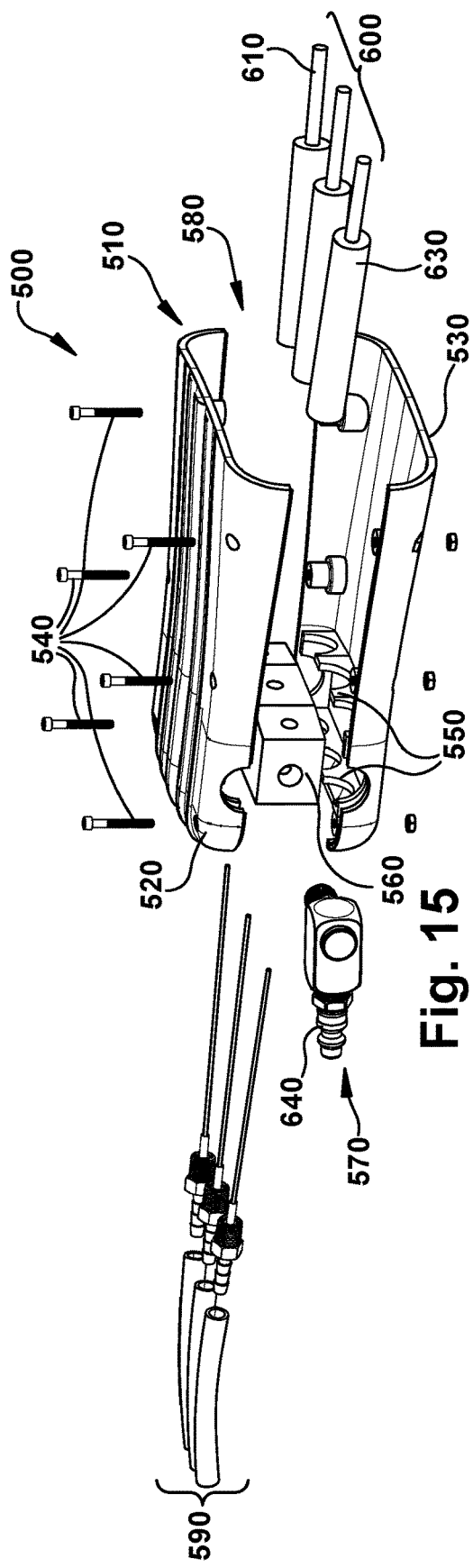

VEHICLE INTERIOR CLEANING APPARATUS

CROSS-REFERENCE TO RELATED APPLICATIONS

This application claims the benefit of U.S. Provisional Patent Application No. 62/934,084, filed on Nov. 12, 2019 and entitled Cleaning System Apparatus for Robotic Cleaning of Vehicle Interiors and U.S. Provisional Patent Application No. 62/934,712, filed on Nov. 13, 2019 and entitled Robot System for In-Line Vehicle Interior Cleaning, the entire disclosures of which are incorporated herein by reference.

TECHNICAL FIELD

The present disclosure relates to cleaning apparatuses. More particularly, described are cleaning apparatuses that can be used for cleaning of interior surfaces of vehicles.

BACKGROUND

Conventional cleaning of vehicle interiors at full-service car and vehicle wash operations are highly labor intensive and require multiple workers using a combination of sprays, wipes, squeegees, towels, air guns or other methods to remove dirt and debris from multiple surfaces, such as surfaces of the floor, seats, dashboard, console and various components of the door. Because many vehicle wash operations use conveyors to move vehicles through the interior cleaning operation quickly—many in a matter of a few minutes—cleaning operations rely on multiple operators using a variety of separate hand tools to clean the various parts of the vehicles' interior.

Vacuuming is an important process used to clean vehicle floors and seating surfaces, including upholstery, and has been a very difficult operation to automate. This is due to the complex geometries of floors, seats, and their mating surfaces, narrow clearances between objects, and the high variability of surfaces from vehicle to vehicle. Further, if dirt or debris is tightly bound to a surface or is sticky or of high viscosity, a worker will typically rub or beat the surface with a purpose-built tool or the worker's hands to loosen or remove the debris. This operation can be rough on the surfaces. Additionally, such operations are difficult to mimic with a robot or automated tool without damaging the surfaces intended to be cleaned.

The tools commonly used by workers to vacuum vehicle interiors typically employ a large, centralized vacuum source connected to flexible hoses, which range in diameter from 1.5- to 3-inches. Attached to the end of the hose is a fully rigid, claw-like nozzle, usually fan-shaped and frequently textured or ribbed on its surface so the textured/ribbed surface can be rubbed against surfaces to dislodge attached debris or dirt. The hardness of the material and rigidity of the of the nozzle is needed to physically loosen the dirt with the vacuum nozzle but can damage some surfaces within a vehicle if not used appropriately. Such nozzles are difficult to use by robots or other automated machinery.

In some instances of interior cleaning, a second piece of equipment, an air-blower tool, may be used as a preceding step to vacuuming. Blowing is primarily used to loosen dust, dirt, and debris, quickly move large pieces of trash or garbage into one area of the vehicle cabin for removal and generally 'prep' the cabin for vacuuming. This work can be done with a variety of tools, from larger, mobile air compressors with attached hoses and nozzles, to smaller, handheld 'gun-type' devices connected to air compressors and actuated by the worker with a trigger grip. Such equipment is designed for use independent of vacuum tools, requiring additional steps. Given their construction, air blower tools also need the same care as vacuum tools to avoid damaging interior surfaces. Last, their conventional elongated shapes and trigger actuators intrinsic to the hand-held designs make them challenging to automate with robots.

Another tool sometimes used for cleaning vehicle flooring is a rotary brush. The rotary brush is typically an electrically or pneumatically powered circular bristle brush head, with polymer or natural-material bristles, rotated at high speed and placed into contact with carpeting, floor mats, or cloth upholstery. This tool is generally used for targeting deeply embedded dirt captured in the fibers of carpets or deep-pile fabric. However, the rotary action can release substantial amounts of debris and dust into the air and, thus, are generally not used inside the vehicle during an in-line cleaning operation. Instead, they are used in a remote location on carpets or floor mats that have been removed and taken away from the vehicle. Aside from the dust release issue, because they must contact the surface to be cleaned, the use of rotary brushes inside a vehicle is difficult to automate by robots. Without a robot having the ability to precisely match the contours of a vehicle's floor, requiring extensive sensing and calculation capabilities, the rotary brush tool may not work efficiently, or damage can be caused to the tool or vehicle.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

According to one example of the present disclosure, a cleaning apparatus is provided. The cleaning apparatus includes a housing comprising: a first end portion having an open end; and a second end portion including a first port configured for connection to a vacuum device and in fluid communication with the open end such that a suction created by the vacuum device can pull air and debris through the open end and into the first port; the diameter of the open end can be substantially larger than the first port; and a nozzle positioned within the housing and configured to expel fluid, such as air, out from the open end. The nozzle expels fluid while the suction simultaneously pulls debris into the first port. A radial distance between the nozzle and an adjacent wall of the housing can be at least one-half inch. A space between the nozzle and the adjacent wall of the housing is unobstructed and an interior of the housing is configured such that during suction, the debris can move along an unobstructed and smooth path to the first port.

According to another example of the present disclosure, a cleaning apparatus is provided which includes a housing having a substantially hollow main body and a first port for connection to a vacuum device; a nozzle positioned within the substantially hollow main body; and a connection portion coupled to the housing and configured for connection to a robotic device, wherein the substantially hollow main body is configured such that a hollow portion of the main body creates a crush zone configured to absorb shock upon impact of the housing with an object and minimize shock transferred to the connection portion.

According to another example of the present disclosure, a cleaning apparatus is provided. The cleaning apparatus includes: a housing configured for touchless cleaning of a vehicle surface, the housing including a main body portion having a rear section and a front section, the front section having an open end; a first port opening into the rear section of the main body portion and in fluid communication with the open end and a vacuum source; and a second port opening into the rear section of the main body portion and in fluid communication with the open end and a fluid source, wherein during a cleaning operation, the housing is held in a spaced apart relation to a surface being cleaned.

BRIEF DESCRIPTION OF THE DRAWINGS

Throughout the drawings and the detailed description, unless otherwise described, the same drawing reference numerals can be understood to refer to the same or similar elements, features, and structures. The relative size and depiction of these elements may be exaggerated for clarity, illustration, and convenience.

FIG. 14 illustrates an exploded bottom view of a cleaning apparatus in accordance with an aspect of the present disclosure.

FIG. 15 illustrates an exploded perspective view of a cleaning apparatus in accordance with an aspect of the present disclosure.

DETAILED DESCRIPTION

Figure 1:
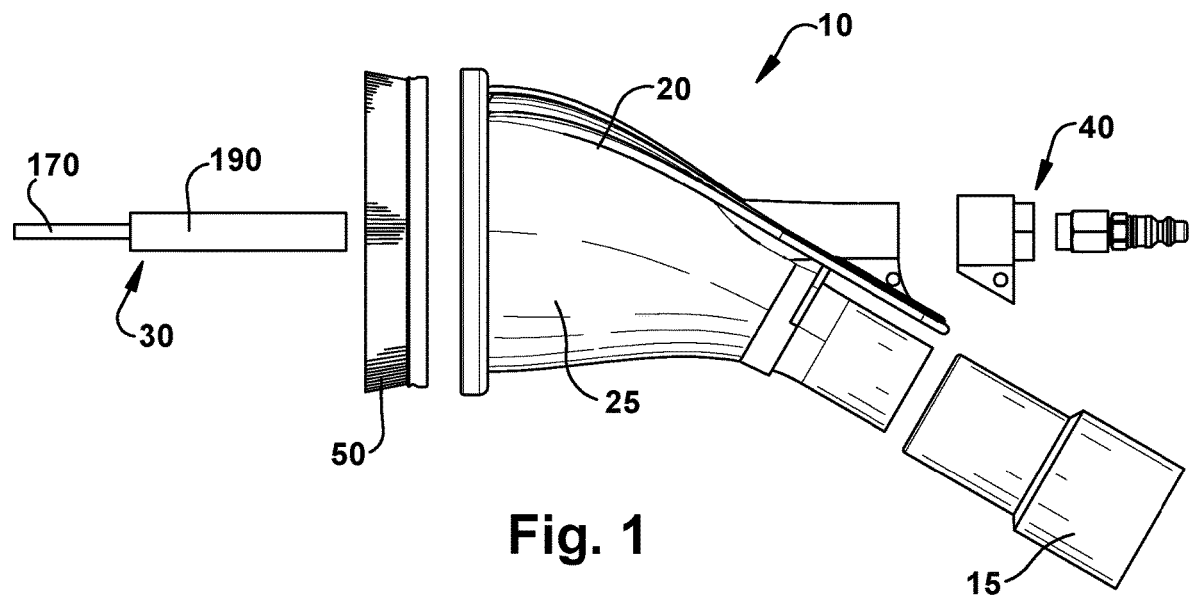
FIG. 1 illustrates an exploded view of a cleaning apparatus in accordance with an aspect of the present disclosure.

In the detailed description that follows, reference is made to the accompanying drawings, which form a part of the description. In the drawings, similar reference numbers typically identify similar components, unless context dictates otherwise. Furthermore, unless otherwise noted, the description of each successive drawing may reference features from one or more of the previous drawings to provide clearer context and a more substantive explanation of the current exemplary embodiment. Still, the exemplary embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Example embodiments of cleaning apparatuses for vehicle interiors will be described more fully hereinafter with reference to the accompanying drawings. The example cleaning apparatuses, however, can be embodied in many different forms and dimensions and should not be construed as limited to the embodiments set forth herein. Rather, these example embodiments are provided so that this disclosure will be thorough and complete, and will fully convey the scope of a cleaning apparatus to those of ordinary skill in the art. Like, but not necessarily the same, elements in the various figures are denoted by like terms for consistency.

The present disclosure addresses the challenges posed by the conventional systems and methods that conduct the aforementioned disparate cleaning operations independently. Specifically, the systems and methods described herein allow for multiple operations to be combined into one step and/or one apparatus and used inside vehicles during and/or in parallel to other vehicle cleaning operations. The systems and methods described herein provide for maintaining or improving cleaning effectiveness while reducing overall cycle time and system complexity, and provides a safer, gentler method for interior vehicle cleaning, including making automated and/or robotic cleaning feasible.

Turning initially to FIG. 1, an exploded view of a cleaning apparatus 10 is illustrated in accordance with an aspect of the present disclosure. The cleaning apparatus 10 incudes a housing 20, which can be manufactured from a soft-bodied or soft-skinned material, such as via single or multi-material injection molding or additive manufacturing. The housing 20 has a substantially hollow main body 25 configured for suctioning vehicle debris into the cleaning apparatus 10. The housing 20 can also be configured for connection to a robotic device, such as such as an industrial and/or collaborative robot (not shown). The cleaning apparatus 10 includes a plurality of ports for connection to both a vacuum source, such as a central vacuum device (not shown), and a fluid source, such as a cleaning liquid source, water source, or high-pressure or compressed gas or air delivery system (not shown). It is to be appreciated that in a commercial application, the aforementioned sources, such as base air and pump utilities are not needed on or near the apparatus. Rather, the apparatus 10 can be coupled to hoses, which are connected to one or more central utilities. Thus, according to one example, the cleaning apparatus can include a fitting or connector 15 for coupling the housing 20 to a hose of a vacuum device or central vacuum system. The connector 15 can be a separate component as shown, or can be materially integral with the housing 20, as desired. The cleaning apparatus 10 can further include a nozzle 30 and one or more fittings 40 for selective connection to a hose for a high-pressure air and/or cleaning liquid delivery system or the like. During use, the various sources can be turned on and off, as desired, for selective cleaning operations. Thus, if the cleaning apparatus 10 is connected to a vacuum device and a compressed air source and the compressed air source is in an off position, the cleaning apparatus 10 can be used in a suction only mode. Likewise, the cleaning apparatus 10 can be used in a blower or sprayer only mode if the vacuum device is in an off position. A dust skirt 50 is optionally coupled to an open end 102 of the main body 25 as will be explained in greater detail below.

Figure 2:
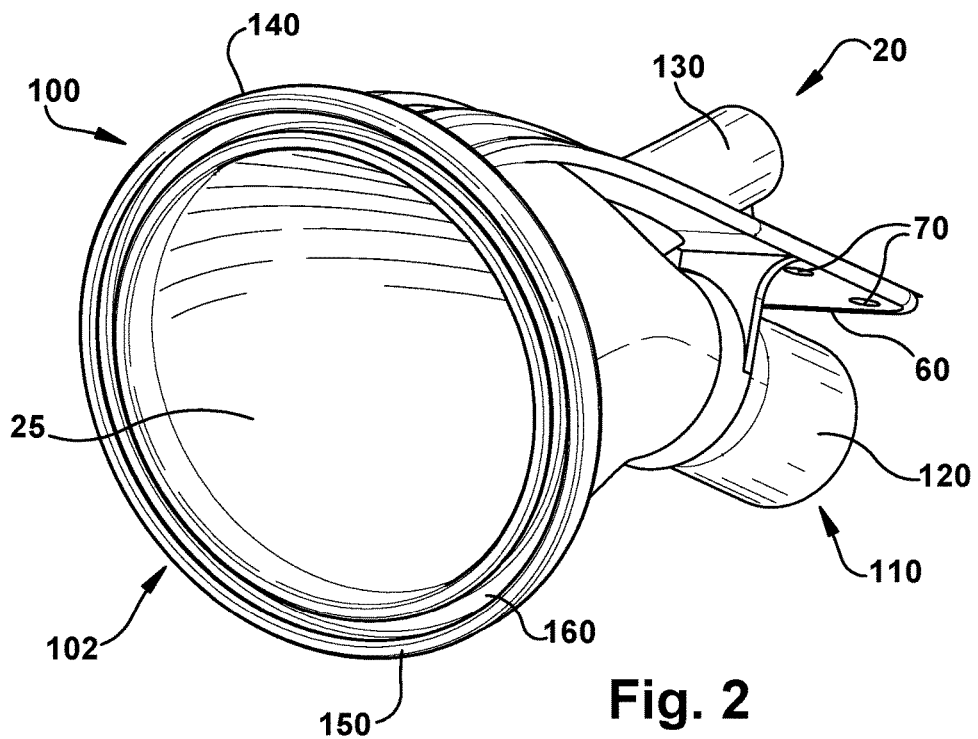
FIG. 2 illustrates a front perspective view of a housing of a cleaning apparatus in accordance with an aspect of the present disclosure.
Figure 3:
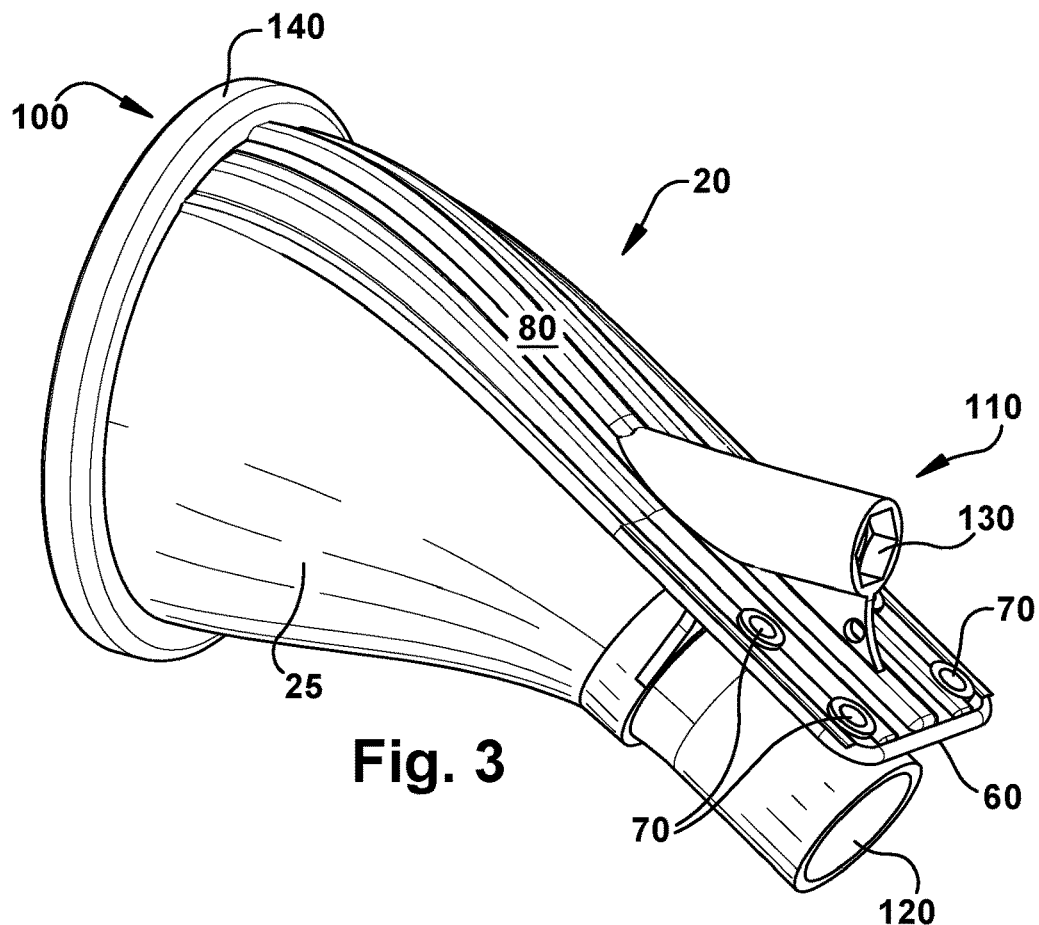
FIG. 3 illustrates a rear perspective view of a housing of a cleaning apparatus in accordance with an aspect of the present disclosure.
Figure 4:
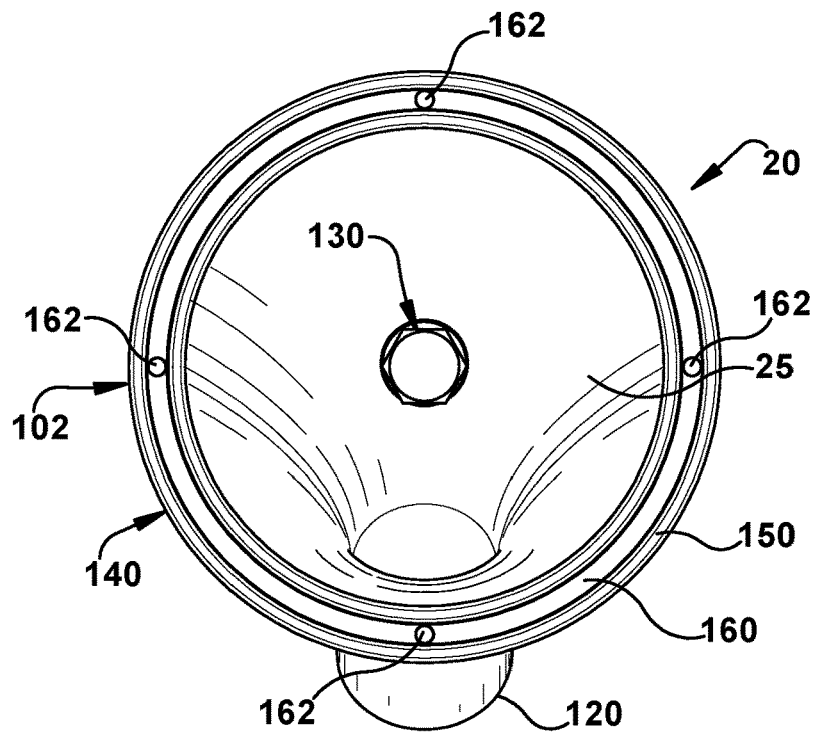
FIG. 4 illustrates a front view of a housing of a cleaning apparatus in accordance with an aspect of the present disclosure.

Turning now to FIGS. 2-4, the housing 20 of the cleaning apparatus 10 is illustrated in accordance with the present example. The housing 20 can be made from a soft, non-rigid and non-marking material, such as an elastomer, thermoplastic, thermoset plastic, TPE, and/or rubber, of a broad range of shore hardnesses suitable to mitigate interior surface damage to a vehicle. Additionally, if used as a robotic end effector, the housing material can be selected to mitigate the need for sophisticated compliant, or break-away, tooling. Alternatively, the housing 20 can be made from a rigid material, such as a polymer, metal, ceramic, wood, glass, or the like, with a soft, non-marking skin covering one or more exterior surface portions of the housing 20. While the cleaning apparatus 10 is configured for substantially touchless cleaning, in the event of inadvertent contact with a vehicle surface, the exterior material of the cleaning apparatus 10 minimizes marking and/or damage to the vehicle surface.

At least one connection portion 60 is secured to or materially integral with the housing and is configured for attachment to a corresponding portion of a robotic device, and more specifically to a robot arm in a robotic cleaning system. The at least one connection portion 60 can include one or more flanges or a plate-type attachment with a plurality of apertures 70 extending therethrough. The apertures 70 are used to secure the housing 20 to a corresponding portion of the robot arm via suitable adapters and/or fasteners. The connection portion 60 may also include a textured surface, such as strengthening ribs, 80 configured to mate with a surface on the robotic device for an improved fit between the components and/or for added strength. It is to be appreciated that any suitable connection portion can be provided to secure the housing 20 directly to the robotic device. Thus, the robotic device is not merely using conventional gripper fingers and picking up a conventional vacuum tool to clean a vehicle interior. Rather, the cleaning apparatus is an end effector for a robot arm so that the cleaning apparatus and the robotic device function together as a vacuum and blower device.

The housing 20 includes a first end portion 100 and a second end portion 110. The first end portion 100 includes an open end 102 that leads to the hollow main body 25 defined by a wall geometry of the housing 20. The shape of the open end 102, as shown in FIG. 4, is round; however, the open end 102 can be of any suitable shape such as oval, oblong, octagonal, triangular, teardrop, etc. and is sized to allow typical interior vehicle debris therethrough, such as food residue, candy wrappers, stones, pieces of turf, coins, small toys, etc. In other words, debris equal to or larger than one-half inch in diameter, and generally larger than one inch in diameter, can be suctioned through the open end 102. The open end 102 is not merely employed for suctioning dust or small particles. The main body 25 shown herein is bowl- or cup-shaped; however, the main body 25 can be bell-shaped, funnel-shaped, cylindrical, or of any other suitable configuration. Despite the shape, the main body 25 defines a substantial hollow or empty space therein. This hollow space within the main body 25 is of a size sufficient to create a collapsible crush zone. In the event of an inadvertent collision between the cleaning apparatus 10 and another object, such as a vehicle surface, the wall of the main body 25 can collapse inwardly, into the hollow space, and absorb energy from the impact. By absorbing the energy, the crush zone protects the object, or vehicle surface from damage. Further, the crush zone is preferably large enough to protect a blower mechanism, such as blower nozzle 30, positioned within the main body 25. Additionally, because the crush zone absorbs the energy or shock during an inadvertent collision, shock transmitted to the robot via the connection portion 60 is limited or prevented. Thus, the crush zone protects the robot from costly damage and significant downtime and eliminates the need for compliant tooling.

The second end portion 110 of the housing 20 includes a plurality of ports, such as a first port 120, which opens into a rear section of the main body 25 and is in fluid communication with the open end 102 via the main body 25. The open end 102 is at a front section of the main body 25. The first port 120 can be a vacuum port and can include a generally tube-shaped portion that can be coupled directly or indirectly to a vacuum hose. Alternatively, the first port 120 can be an opening provided through rear section of the main body. The vacuum hose can be secured directly or indirectly to such opening. The second end portion 110 further includes a second port 130 which opens into the rear section of the main body 25. The second port 130 can be a blower port or a sprayer port, is also in fluid communication with the open end 102 via the main body 25, and can include a generally tube-shaped portion extending away from the housing 20 or can comprise an opening provided through the rear section of the main body 25. As shown in FIG. 4, the second port 130 can open into a central portion of the rear section of the main body 25 such that a circumference of the second port 130 and a circumference of the first end portion 100 are concentrically arranged. The first port 120, can be offset from the center at the rear section of the main body 25. A diameter of the first port 120 is of a size sufficient to receive large debris therethrough, such as one-half inch or larger and generally, one inch or larger. An interior shape of the main body 25 is free from any cavities, pockets, corners, edges, and the like in which debris could get stuck during a cleaning operation. Regardless of where debris enters the open end 102 or moves within the main body 25, the debris is capable of moving freely towards the vacuum port without getting caught or hung up by any portion of the housing configuration or geometry or by any other impediment within the housing. In other words, the interior shape configuration allows for unobstructed movement of debris within the housing during a suction operation. That is, the housing configuration includes no obstructed paths between the open end 102 and the first port 120. Thus, the configuration of the housing, and specifically, the interior of the main body, mitigates clogging or piling up of debris within one or more portions of the housing, as is common in prior art devices.

Although numerous relative sizes of the cleaning apparatus can be realized, according to the illustrated examples, a diameter of the first end portion 100 and the open end 102 is larger than the diameter of the first port 120 and the diameter of the second port 130. The large diameter of the first end portion 100 provides space for a desired nozzle configuration, such as nozzle 130, and space to suction large debris through the open end 102, past the nozzle 130, and through the first port 120. According to one example, a radial distance x between a distal end of the nozzle 130 and an adjacent wall of the housing 20 can be approximately equal to or greater than the diameter of the first port 120. Thus, a diameter of the open end 102 can be approximately twice the diameter of the first port 120. There is no intervening structure present between the distal end of the nozzle 130 and the adjacent wall of the housing 20 such that debris can freely enter this space. Thus, according to one example, the cleaning apparatus can include a first port 120 having a diameter of at least 0.5 inches and a radial distance x between a distal end of the nozzle 130 and an adjacent wall of the housing 20 of at least 0.5 inches. However, for a cleaning apparatus configured to suction large debris typically found in a vehicle interior, such as loose change, each of the first port 120 and the radial distance x can be approximately equal to or greater than 1.0 inch, in order to accommodate a quarter and other vehicle debris. According to another example, the first end portion 100 can have a diameter ranging from about 1.5 to about 60.0 inches, the first port 120 can have a diameter ranging from about 0.5 to about 6.0 inches, and the second port 130 can have a diameter ranging from about 0.25 to about 3.0 inches. More specifically, according to an embodiment for a cleaning apparatus used in cleaning a mid-sized sedan, the diameter of an opening at the first end portion 100 is about 4.5 inches, the diameter of the first port is about 1.75 inches, and the diameter of the second port 130 is about 1.0 inch.

The sizes and dimensions described herein can vary and may be dependent upon the type and size of the vehicle being cleaned and/or the interior dimensions thereof. Likewise, the overall shape of the cleaning apparatus 10 and housing 20 can vary and may be dependent upon the type and size of vehicle being cleaned and/or the interior dimensions thereof. In other words, a large cleaning apparatus can include multiple vacuum ports and multiple blower and/or sprayer ports when used in larger applications, such as cleaning an interior of an over the road truck trailer or the like. In each instance, the first end portion 100 creates an opening that can handle large pieces of debris that may be encountered when cleaning vehicles, such as food residue, candy wrappers, stones, pieces of turf, coins, small toys, chunks of wood from pallets, etc. Having a sufficiently large area for suction in the first end portion 100 and through the vacuum port(s) mitigates pressure drop and/or shut down from clogging of such debris.

A rim 140 extends axially and radially from the first end portion 100 of the housing 20. The rim 140 includes a front face 150 and a channel 160 recessed within a central portion of the front face 150. The channel 160 can extend around an entire circumference of the front face 150 and is configured to receive dust skirt 50 therein. The dust skirt 50 can be made from polymer or natural bristles or flexible bristles, which facilitates containment of turbulent air within the diameter of the open end 102 of the housing 20. The bristles can be flexible and thus, can bend or fold over each other while creating a curtain effect. This curtain effect creates a barrier to protect the interior of the vehicle from the effects of the turbulent air created by the blower nozzle 30. As an alternative to bristles, the dust skirt 50 can comprise a solid elastomeric or polymeric skirt or can be made from a plurality of overlapping flaps and/or panels with slits therebetween. A length of the dust skirt 50 can vary, such as from ⅛ inch up to 3 inches or 12 inches, depending upon the overall size and weight of the housing and a desired distance the main housing is from a surface to be cleaned. Moreover, the dust skirt 50 may have varying lengths within the bristles, flaps, and/or panels, as desired. The dust skirt 50 can be secured within the channel 160 by potting with an adhesive material directly into the channel, crimped into a metal ring, which is compression fit or adhered to the channel, or depending upon the housing and skirt material, may be molded in place, laser welded, or otherwise fastened. See FIGS. 5 and 6. The dust skirt 50 preferably extends around the circumference of the first end portion 100 to minimize dust blowing throughout the vehicle during cleaning operations. At least one sensor, such as a proximity sensor, pressure sensor and/or force sensor 162 may also be positioned or embedded within the housing, such as within channel 160 to determine when and with how much force the dust skirt 50 or cleaning apparatus 10 has contact with a surface or object. Alternatively, or additionally, at least one sensor may be coupled to or embedded within the body of the housing 20. One or more such sensor(s) 162 can be used to mitigate collision of the housing 20 with a vehicle surface.

Figure 5:
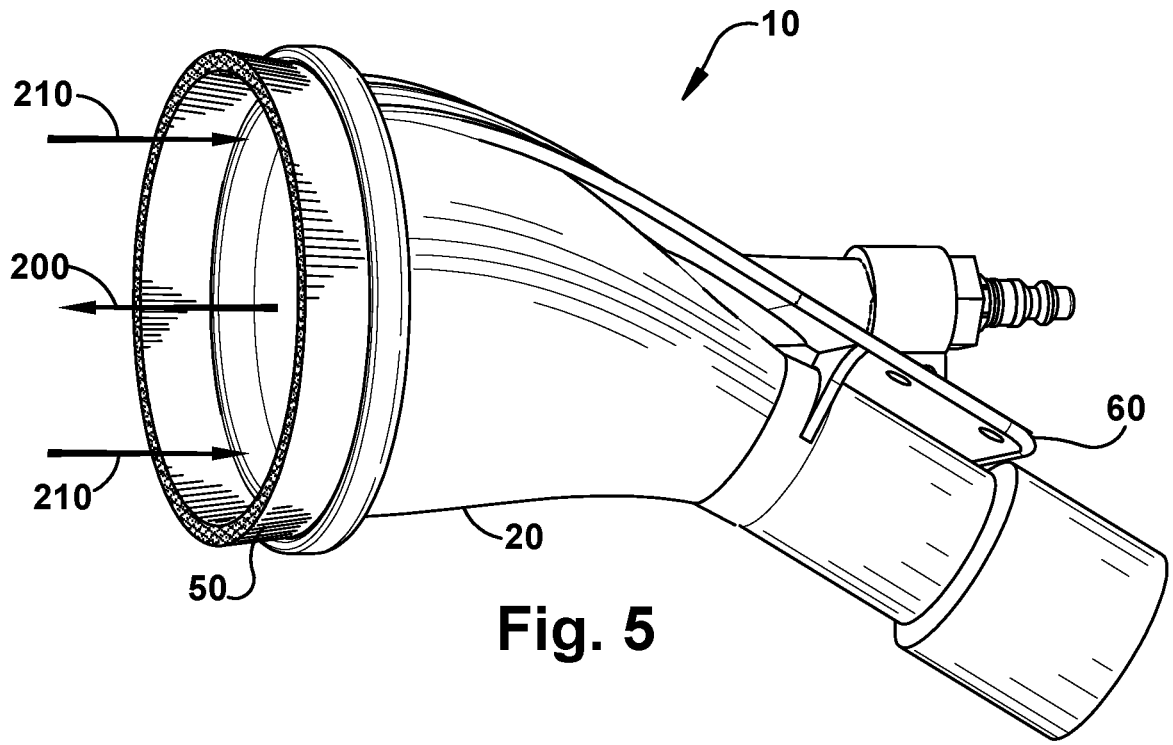
FIG. 5 illustrates a side perspective view of an assembled cleaning apparatus in accordance with an aspect of the present disclosure.
Figure 6:
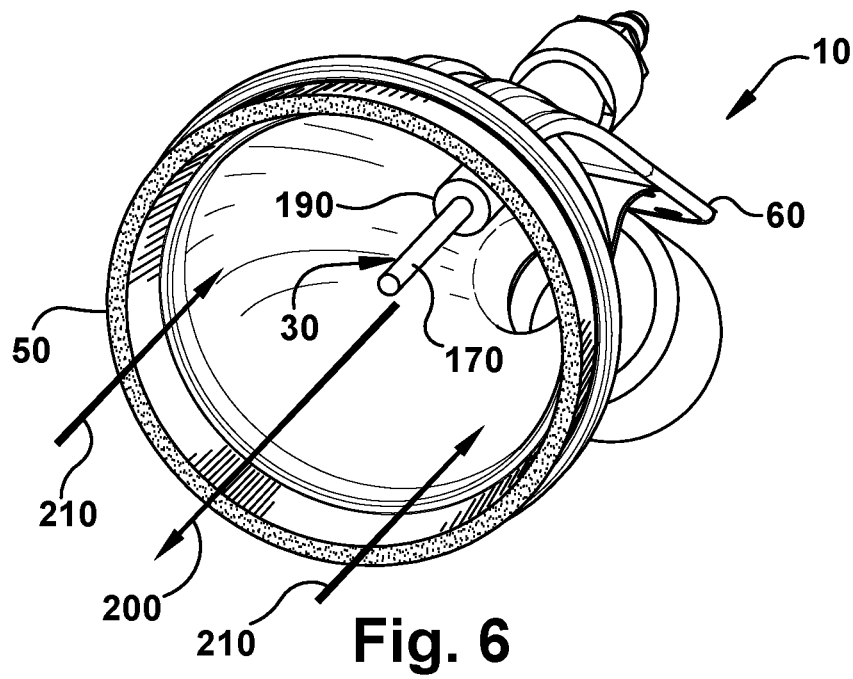
FIG. 6 illustrates a front perspective view of an assembled cleaning apparatus in accordance with an aspect of the present disclosure.
Figure 7:
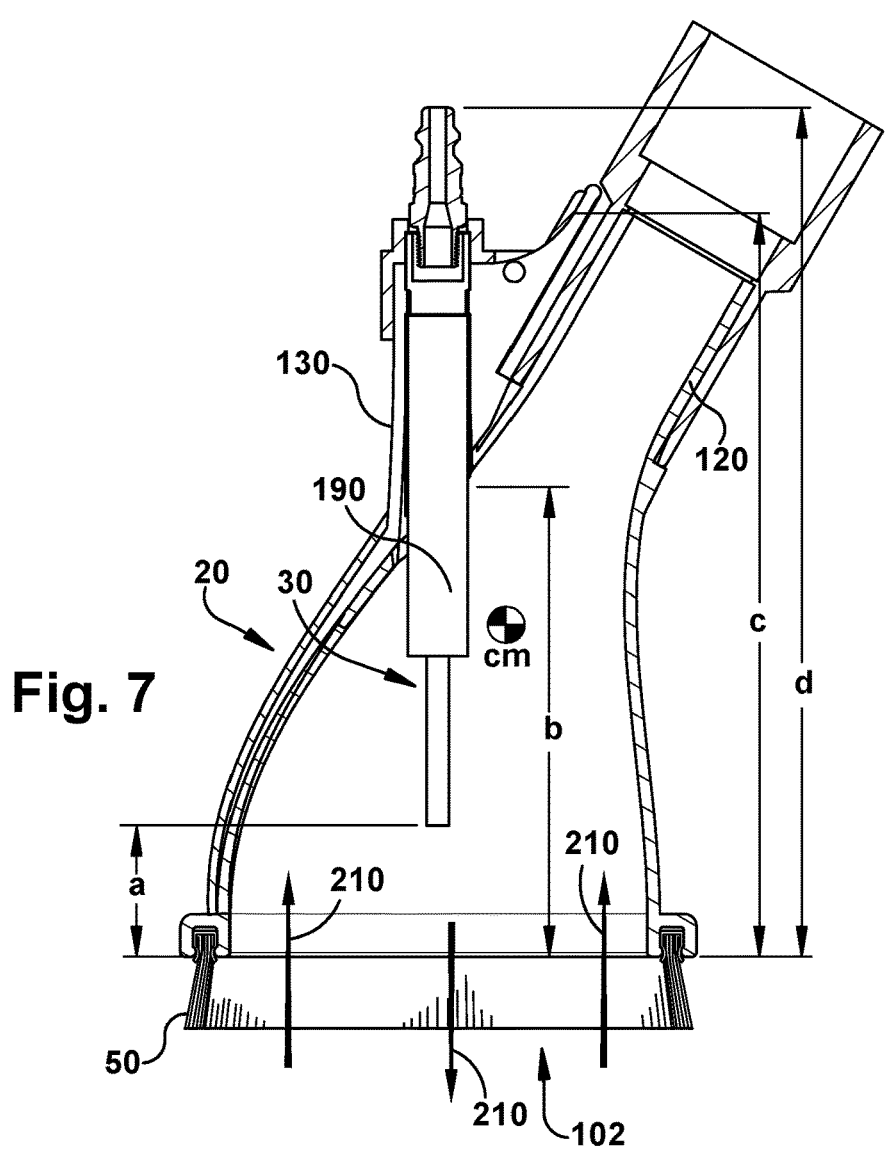
FIG. 7 illustrates a cross sectional view of an assembled cleaning apparatus in accordance with an aspect of the present disclosure.

FIGS. 5-7 illustrate the cleaning apparatus 10 in an assembled state in accordance with the present example. The nozzle 30 extends through the second port 130 and into a central portion of the housing 20. A distal end of the nozzle 30 extends toward the first end portion 100 of the housing 20. The nozzle 30 can take the form of any suitable nozzle used for directing pressurized fluids, such as air or gas, water or cleaning fluids, towards a vehicle interior surface.

According to one example, the nozzle 30 is an air blower nozzle and includes a distal end 170 and a proximal end 190. The distal end 170 can be a flexible tube or hose configured to spray the air and/or fluid as the distal end 170 can move or rotate in a corkscrew pattern or whip or oscillate in an erratic manner upon discharge of the fluid under pressure. The nozzle 30 may also include a smaller second tube (not shown) concentrically arranged with the distal end 170 to distribute liquids into an air/gas stream discharged through the nozzle 30. The extent of rotation or movement in the hose can depend on a length of the hose, delivery pressure of the air or fluid, among other factors. It is to be appreciated that rather than the three-component part shown and described, the nozzle 30 may be made from a single flexible tube. Using a flexible nozzle provides for expanded spray coverage as compared to a straight, rigid nozzle. However, a straight, rigid nozzle can be employed if a more targeted or concentrated spray is desired.

As known in the art, the nozzle 30 can alternatively comprise a bent or angled, rigid distal end (not shown) rotatable within the proximal end 190 via one or more bearings or other suitable connection. Pressurized or compressed air passing through a portion of the nozzle 30 is ejected from the distal end 170. As the air is ejected, the force of the pressurized air causes the distal end 170 to rotate at a high speed, thereby creating a circular path of pressurized air and enhancing the efficacy to blow dirt and debris from a vehicle surface. An angle of the distal end 170 controls a spray pattern and path of the pressurized fluids. The greater the angle, the larger the fluid path and the greater area is affected during cleaning.

Any suitable blower or sprayer mechanism can be provided through the second port 130 and controlled via a valve external of the cleaning apparatus 10. Additionally, a depth the nozzle 30 can be infinitely adjustable within the cleaning apparatus by modifying the positioning thereof such as via a threaded rod, thumbscrew device, spring-loaded pins, or any suitable mechanism. For instance, a depth of the nozzle 30 can be adjusted within the housing based on a type of surface to be cleaned, such as a deep pile carpet or a smooth surface, to increase the efficacy. Moreover, the depth of the nozzle 30 with respect to the open end 102 of the housing can changed manually, remotely, or automatically, such as via a programmed setting. As with an angle of a bent or flexible distal end, the depth of the nozzle 30 with respect to the open end 102 impacts a circumference of the air path and the area affected during cleaning. For a cleaning apparatus used in a typical passenger vehicle cleaning operation, this distance a can be approximately one and one-half inches. (See FIG. 7) However, any suitable distance can be used depending on a desired air path. Additionally, this distance can be adjusted during cleaning. For instance, for a first cleaning operation, a depth of the distal end 170 of nozzle 30 can be adjusted such that a diameter of the blower air path is approximately half the diameter of the open end 102 of the first end portion 100. For a second cleaning operation, the depth of the nozzle 30 can be adjusted such that a diameter of the blower air path is approximately equal to the diameter of the open end 102 of the first end portion 100. The nozzle 30 is generally positioned within and supported by second port 130. The nozzle 30 can be adjusted between a position in which the second port 130 opens into the rear section of the main body 25 to a position generally flush with the face of the open end 102. As an example, distance b, which is a distance between the opening of the second port 130 and the face of the open end 102, can be approximately five inches. Thus, in this example, the nozzle depth can be adjusted between about five inches to zero inches with respect to the face of the open end 102. However, the distal end of the nozzle 30 is preferably recessed with respect to the face of the open end 102, as shown in FIG. 7.

As the nozzle 30 is expelling air or fluid from the open end 102 of the housing 20 in a direction generally shown by arrow 200, the vacuum device is simultaneously suctioning air through the housing 20 in a direction generally shown by arrows 210 and into the first port 120. The air from the nozzle 30 and the vacuum device can flow in generally opposite directions with respect to one another. Thus, the cleaning apparatus 10 is configured to facilitate the simultaneous use of suction and blower devices through a single apparatus to generate turbulent airflow which loosens and removes debris attached to surfaces without the need to contact any interior vehicle surfaces. Additionally, if the cleaning apparatus 10 is operated by a robot device, higher air pressures and suction (e.g., more than 100 psi) can be utilized as compared to conventional hand tools. This, coupled with the turbulent airflow mechanics, allows cleaning of interior vehicle surfaces in a single pass with a single device, whereas conventional systems require workers using multiple passes with multiple devices.

During operation, the cleaning apparatus 10 does not require contact with the interior surfaces to be cleaned. In other words, the cleaning apparatus 10 is configured for touchless cleaning. In use, the housing 20 is held in a spaced apart relation to the surface being cleaned. More specifically, the open end 102 of the housing 20 is held in a position facing but without contacting the surface being cleaned. The size of the cleaning apparatus 10 is such that it can be used in this position within various spaces within an interior of a vehicle, such as under the dash, above the headrest, etc. According to the example of FIG. 7, a length of the cleaning apparatus from the open end 102 of the housing to and end of the first port 120, distance c, is approximately eight inches and an overall length of the cleaning apparatus to an end portion of the blower assembly, distance d, is approximately eight and one-half inches. Connections between the blower assembly and the pressurized fluid source and between the vacuum port connection and the vacuum source typically comprise flexible tubing, thus allowing the cleaning apparatus 10 to easily access the necessary spaces for cleaning the vehicle interior.

Additionally, because the open end 102 applies a vacuum force to a wide surface area being cleaned, the cleaning apparatus 10 wants to adhere the open end 102 of the housing 20 to the cleaning surface, causing the housing 20 to 'stick', which can disrupt the vacuum operation. To address this phenomenon, the cleaning apparatus 10 is configured such that when the open end 102 of the housing 20 is facing and generally parallel to the surface being cleaned, the center of mass CM lies above and within the perimeter of the open end 102. This configuration, rather than controlling the apparatus from a grip or mechanism that is linearly distanced from a centerline of the open end 102, allows for far greater control of the cleaning apparatus's vertical distance above the cleaning surface and its movement across, or over, the surface, even when subjected to substantially greater vacuum force. Further still, due to the positioning of the vacuum and fluid connections at the second end portion 110 of the cleaning apparatus 10, the center of mass CM of the cleaning apparatus 10 stays generally centered above and within the perimeter of the open end 102 during use, or when the open end 102 of the housing 20 is facing downward towards the surface to be cleaned. This allows for improved control and precision of the cleaning apparatus's distance from the cleaning surface and lateral movement 10 during use with less force needed. Thus, the housing 20 does not require contact with the cleaning surfaces, as in conventional vacuum devices, and can be easily maneuvered while keeping a distance from the cleaning surface during use. It is to be appreciated that the center of mass CM shown in FIG. 7 is an example and can vary due to the material of the housing and/or the type of nozzle and/or a grip configuration; however, in all such configurations, the center of mass CM lies above and within a perimeter of the open end 102 when in use.

Additionally, a plurality of sensors 162 can be incorporated into the cleaning apparatus 10 to facilitate motion and path planning in the case of use with a robotic device, or to provide general alerts to a user during manual use. The sensors 162 can include one or more of force sensors, proximity sensors, speed/acceleration sensors or the like. While the sensors 162 shown in FIG. 4 are depicted as embedded in the dust skirt channel 160, sensors can be alternatively or additionally coupled to any desirable portion of the housing, such as in external flanges, secured to a surface of the dust skirt channel 160, and/or secured to or embedded in a wall of the housing 20. If a dust skirt 50 is present, the sensors can control the cleaning apparatus 10 such that the dust skirt 50 may gently make contact with the interior surfaces or come within a predetermined distance, such as one-half inch, or predetermined distance range of the interior surfaces in order to contain dust within the housing 20. The blower and suction pressure and/or volume and/or robot arm movements can be remotely actuated and controlled based on sensor feedback and/or in conjunction with central or local path planning and motion control software.

Figure 8:
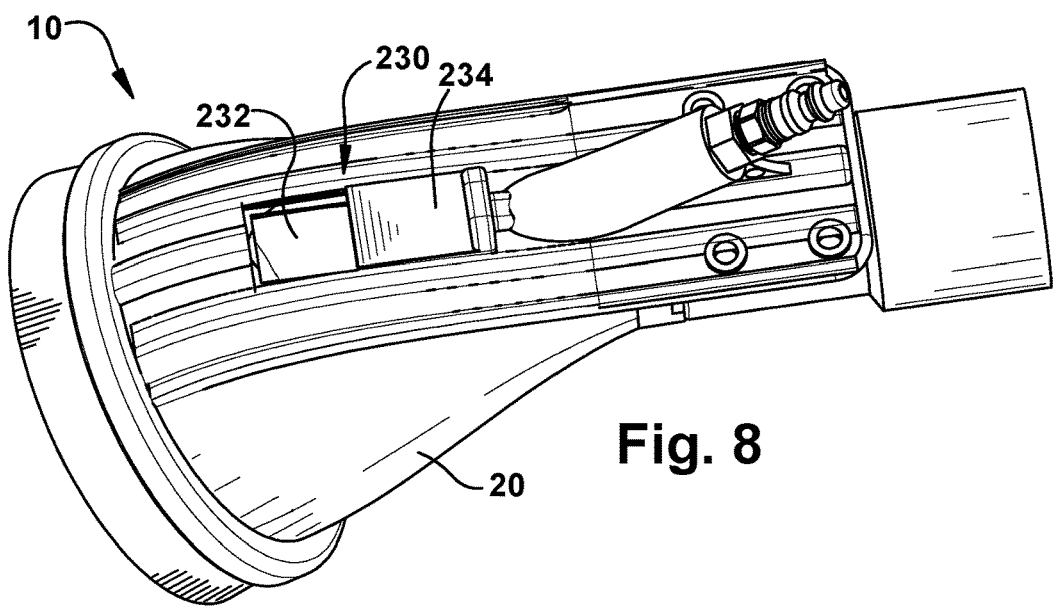
FIG. 8 illustrates a top perspective view showing an example vent for a cleaning apparatus in accordance with an aspect of the present disclosure.
Figure 9:
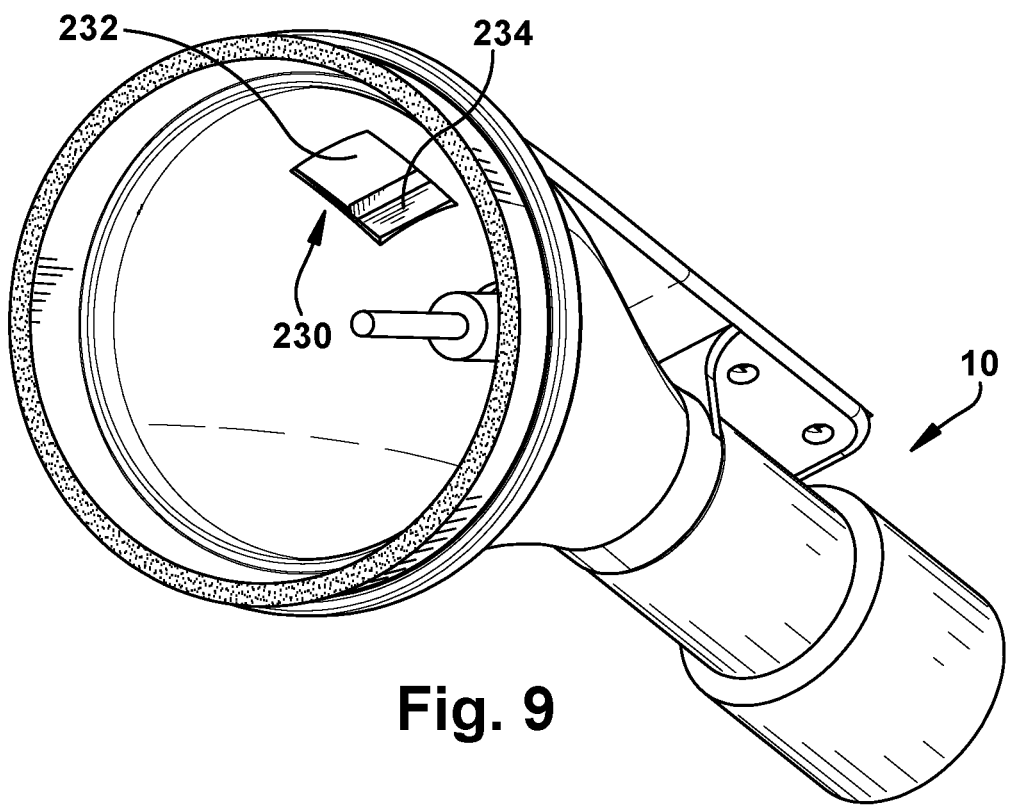
FIG. 9 illustrates a perspective view showing the example vent of FIG. 8 in accordance with an aspect of the present disclosure.

Turning now to FIGS. 8 and 9, the cleaning apparatus 10 is illustrated with an example vent 230 used for adjusting a suction pressure through the housing 20. The vent 230 includes an opening 232 through a wall of the housing 20 and a slidable gate 234 for adjusting a size of the opening 232. The larger the opening, the more the suction pressure created by the vacuum device is reduced. As shown, the vent 230 can be adjusted manually by sliding the gate 234 to a desired position. Positional markings can be provided on the housing as a guide for positioning the gate 234, if desired. Alternatively, or additionally, the vent 230 can be configured for automatic adjustment, such as via programming. It is to be appreciated that the vent 230 can be of any suitable shape and configuration and can be positioned at any desired location as long as the vent 230 allows for adjustment of the vacuum, or suction, pressure. For instance, two or more vents can be provided through the housing. A first vent can be automatically controlled and a second vent can be manually controlled. The vent can have a rotatably adjustable cover and a plurality of holes provided through the housing that can be closed by the cover. The vent opening can be increased or decreased by rotating the cover.

Figure 10:
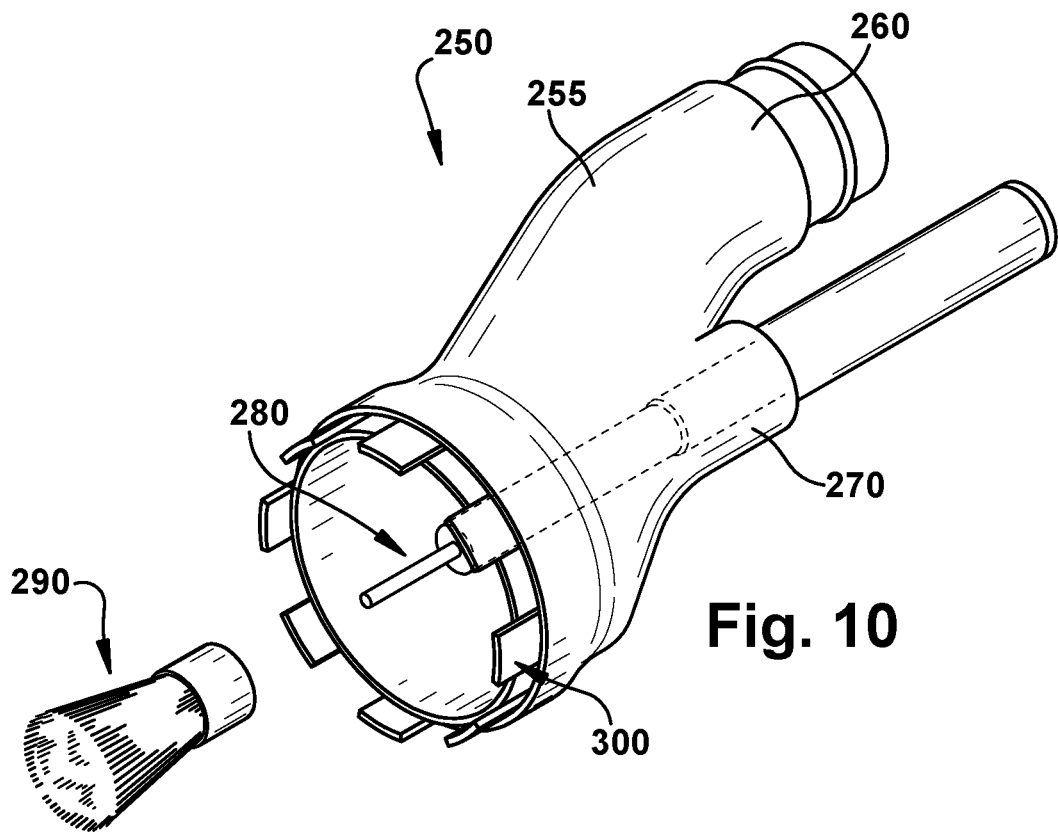
FIG. 10 illustrates a side perspective view of a cleaning apparatus with a removable rotatory brush in accordance with an aspect of the present disclosure.

FIG. 10 illustrates another example of a cleaning apparatus 250. The cleaning apparatus 250 includes a housing 255 having a first port 260 for connection to a vacuum system and a second port 270 for connection to a blower system, such as a high-pressure air system, or a fluid delivery system. A nozzle 280 extends through the second port 270 into a central portion of the housing 255 to direct high-pressure air, steam, or cleaning fluid towards a surface while the vacuum system pulls air and debris into the housing 255 in a generally opposite direction towards the first port 260. A pneumatically, hydraulically, or electrically powered rotary brush head 290 can be positioned in an interior central portion of the housing 255 around the nozzle 280. The rotary brush head 290 can be manually or automatically removable or retractable into the housing such that it is only present when needed. It is to be appreciated that the rotary brush head 290 may be provided without the nozzle 280 and the second port 270 can be used to support the rotary brush head 290 connection instead. Due to a vacuum suction surrounding the rotary brush head 290, any debris that become airborne can be removed from the air immediately via suction. Additionally, a dust skirt 300 can be provided to further contain airborne debris within the housing 255 of the cleaning apparatus 250. In this embodiment, the blower and suction pressure and/or volume and a rotational speed of the brush can be remotely actuated and controlled based on sensor feedback and/or in conjunction with central or local path planning and motion control software.

Figure 11:
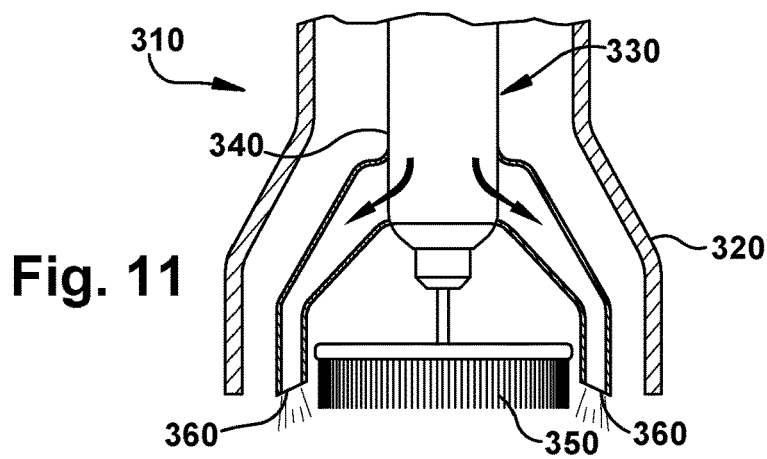
FIG. 11 illustrates a cross sectional view of an end portion of a cleaning apparatus in accordance with an aspect of the present disclosure.
Figure 12:
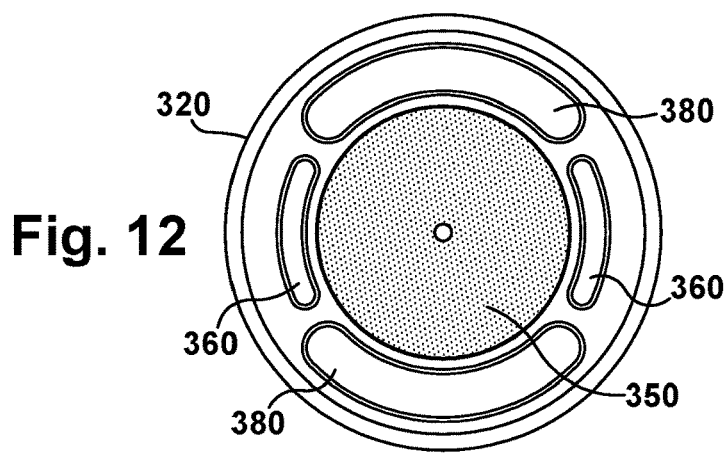
FIG. 12 illustrates a diagram of the cleaning apparatus of FIG. 9 in accordance with an aspect of the present disclosure.

FIGS. 11-12 illustrate another example embodiment of a cleaning apparatus 310. FIG. 11 depicts a cross-sectional view of an end portion of the cleaning apparatus 310. A housing 320 for the cleaning apparatus 310 is substantially bell-shaped and includes a rotatable drive shaft 330 extending through a central portion of the housing 320. The drive shaft 330 can be coupled to a motor (not shown) at a first end and a brush head 350 at a second end. The drive shaft 330 can be encased within and secured to a blower housing 340 such that the blower housing 340 rotates with the drive shaft 300. The blower housing 340 includes at least one blower port 360 that extends towards the end portion of the cleaning apparatus 310 to expel high-pressure air, steam, or cleaning fluid from a position located radially between the apparatus housing 320 and the rotatable brush head 350. In the illustrated embodiment, two blower ports 360 are provided and positioned approximately 180-degrees from one another. See FIG. 12. In one or more spaces 380 between the apparatus housing 320 and the rotatable brush head 350 that is not occupied by a blower port 360, a vacuum suction is pulled to remove debris, including any airborne debris created by the blower port(s) 360 and/or brush head 350 during cleaning.

Figure 13:
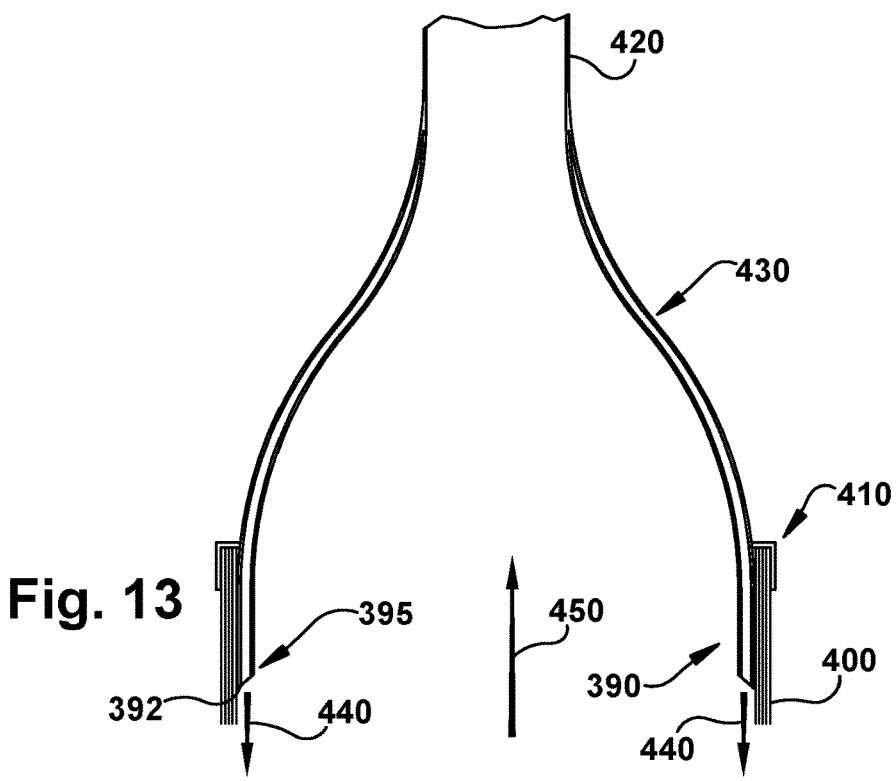
FIG. 13 illustrates a cross sectional view of a portion of a cleaning apparatus in accordance with an aspect of the present disclosure.

FIG. 13 illustrates an air blade design that can be used in any of the above-described cleaning apparatuses in lieu of or in addition to a central blower or sprayer. The air blade 390 can includes a leading edge 392 and a trailing edge 395. The air blade 390 is configured to expel highly pressurized from an outer circumference of the apparatus as a vacuum suction is pulled through a central portion of the apparatus through a vacuum port 420. An air guard 400 can be provided around an outer circumference of the air blade 390 to protect both the air blade 390 and the cleaning surfaces from damage in any event of inadvertent contact with the cleaning apparatus. One or more sensors (not shown) can be housed within a channel 410 used to secure the air guard 400 and/or embedded within a housing to further mitigate contact between the cleaning surfaces and the housing. In this configuration, pressurized air is directed towards the cleaning surfaces in the direction shown by arrows 440; while the vacuum suction is pulled in a substantially parallel and opposite direction, as shown by arrow 450.

In each of the embodiments described herein, multiple cleaning methodologies and devices are combined into one cleaning apparatus. The apparatus, or tool, allows for high pressure turbulent fluid flow and/or a rotating brush for dislodging dirt and debris from vehicle surfaces to be used in conjunction with a high-power vacuum which suctions dirt or trash away from the vehicle's interior in one step. Because the combination of high-pressure air and high-power vacuum do not require the tool to be directly in contact with the surfaces, robotic automation of the operation is greatly simplified. Touchless cleaning of this type allows for substantial reduction in the data collection, processing, and control speed and complexity needed for robotic control. For example, rather than requiring sub-millimeter accuracy in detection and path planning of a robot arm to avoid potential collisions and damage to a vehicle's interior, the tool can safely hover and work effectively above the cleaning surfaces, such as several millimeters or more, speeding and simplifying the task. By incorporating soft, non-marking materials as the housing or skin attached to the housing, the chances of damage caused by inadvertent contact with surfaces are further reduced.

Turning now to FIGS. 14 and 15, another cleaning apparatus 500 is illustrated in accordance with an aspect of the present disclosure. The cleaning apparatus 500 is shown in an exploded state and functions as a multi-head sprayer device. A multi-head sprayer is useful for cleaning and/or drying planar and non-planar interior vehicle surfaces, such as dashes, consoles, and door panels. As with the previously described cleaning apparatuses, the multi-head sprayer enables a touchless approach while maximizing surface area and effective cleaning with one pass over the surface to be cleaned. The cleaning apparatus 500 includes a housing 510, which can be formed by an upper shell 520 coupled to a lower shell 530 via a plurality of fasteners 540. The upper and lower shells 520, 530 are configured to define a substantially hollow or empty space therebetween when assembled together. This hollow space creates a collapsible crush zone. In the event of an inadvertent collision between the cleaning apparatus 500 and another object, such as a vehicle surface, the wall of the housing 510 can collapse inwardly, into the hollow space, and absorb energy from the impact. By absorbing the energy, the crush zone protects the object, or vehicle surface from damage. Further, the crush zone is preferably large enough to protect the sprayers positioned within the main body 25. Additionally, because the crush zone absorbs the energy or shock during an inadvertent collision, shock transmitted to the robot via the connection portion is limited or prevented. Thus, the crush zone protects the robot from costly damage and significant downtime and eliminates the need for compliant tooling.

At least one, preferably both, of the upper and lower shells 520, 530 include one or more projections 550 for securing a manifold 560 therebetween when the upper and lower shells 520, 530 are assembled. The housing 510 is generally rectangular or wedge-shaped and includes a first end 570 and a second opposing end 580. It is to be appreciated that the housing 510 can be of any suitable shape and size. For instance, the housing 510 can have a length ranging from approximately 2 to approximately 50 inches in length, depending upon the application of the cleaning apparatus 500, such as a type and/or size of vehicle being cleaned. The housing 510 can be made from a soft, non-rigid and non-marking material, such as an elastomer, thermoplastic, thermoset plastic, TPE, and/or rubber, of a broad range of shore hardnesses suitable to mitigate interior surface damage and further mitigate a need for sophisticated compliant, or breakaway, tooling. Alternatively, the housing 510 can be made from a rigid material, such as a polymer, metal, ceramic, wood, glass, or the like, with a soft, non-marking skin covering one or more exterior surface portions of the housing 510. While the cleaning apparatus 500 is configured for substantially touchless cleaning, in the event of inadvertent contact with a surface, the exterior material of the cleaning apparatus 500 is selected to minimize marking and/or damage to the surface.

At least one connection portion (not shown) can be secured to or materially integral with the housing and is configured to be secured to a corresponding portion of a robotic cleaning device, and more specifically to a robot arm in a robotic cleaning system. The at least one connection portion can include one or more flanges or a plate-type attachment with a plurality of apertures extending therethrough. The apertures are used to secure the housing 500 to a corresponding portion of the robot arm via suitable fasteners. The connection portion may also include a textured surface, such as strengthening ribs, configured to mate with a surface on the robotic device for an improved fit between the components and/or for added strength. Thus, the housing 500 is secured directly to the robot device. The robot device is not merely using conventional gripper fingers and picking up a conventional sprayer tool to clean a vehicle interior. Rather, the cleaning apparatus 500 is an end effector for a robot arm and the two function together as a multi-head sprayer device.

At the first end 570 of housing 510, one or more supply lines 590 feed into a first side of the manifold 560. The supply lines 590 are configured to supply at least one fluid, such as pressurized air, water, steam, cleaning detergent, or the like. Secured to an opposing side of the manifold 560 are a corresponding number of sprayer nozzles 600. While three supply lines 590 and three sprayer nozzles 600 are depicted herein, the present embodiment can be configured with as little as one supply line and sprayer nozzle to as many supply lines and sprayer nozzles as desired. The supply lines 590 and sprayer nozzles 600 can be provided in varying configurations to dispense the desired cleaning media.

According to the illustrated example, each sprayer nozzle 600 can include a flexible first end 610 and a second end 630. The first end 610 can be rotatable within the second end 630 via a bearing or other suitable connection. Pressurized or compressed fluid passing through a central portion of the sprayer nozzle 600 is ejected from the flexible first end 610. As the fluid is ejected, the force of the pressurized fluid causes the flexible first end 610 to rotate at a high speed, thereby enhancing the efficacy to spray the air/water/detergent on a desired vehicle surface. However, any suitable sprayer nozzle 600 configuration can be employed, such as one with a rigid bent first end as known in the art. Moreover, the cleaning apparatus 500 can include two or more different types of spray nozzles. Because the cleaning apparatus 500 is coupled to and operated by a robot device, higher air pressures (e.g., up to 130 psi or higher) can be utilized as compared to conventional hand tools. This coupled with the turbulent airflow mechanics allow cleaning of interior vehicle surfaces in a single pass with a single device, whereas conventional systems require workers using multiple passes with multiple devices.

Figure 16:
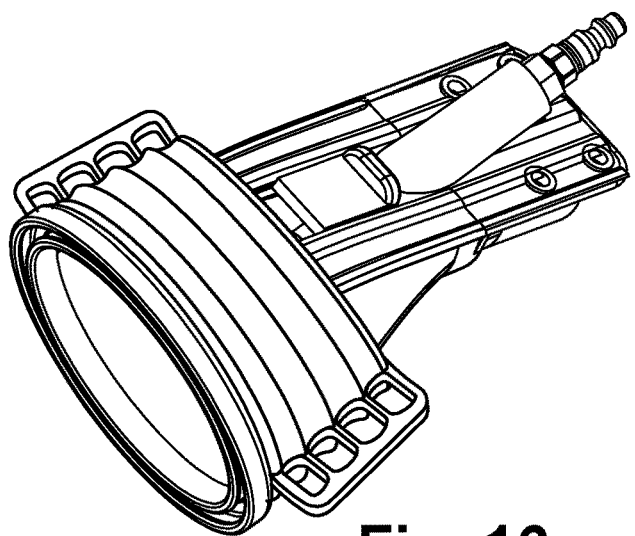
FIG. 16 illustrates an example grip for use with a cleaning apparatus in accordance with an aspect of the present disclosure.
Figure 17:
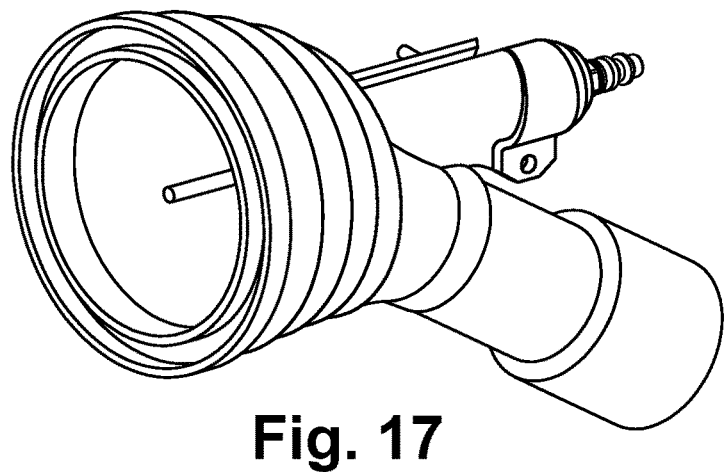
FIG. 17 illustrates another example of a grip for use with a cleaning apparatus in accordance with an aspect of the present disclosure.
Figure 18:
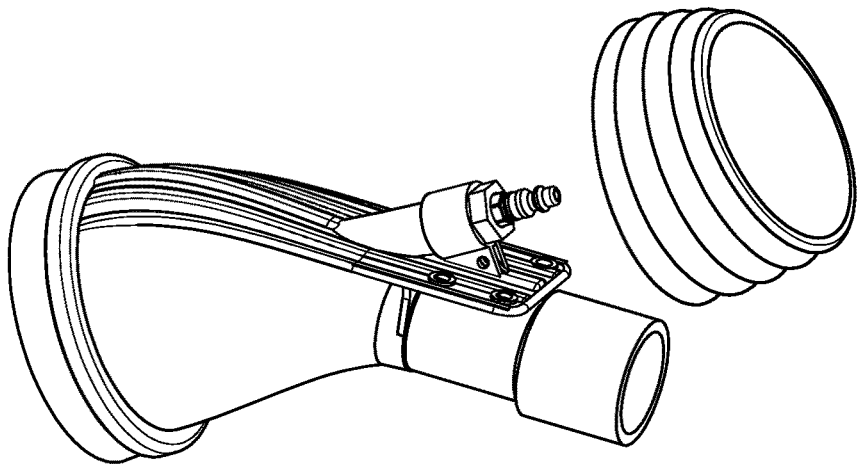
FIG. 18 illustrates another example of a grip for use with a cleaning apparatus in accordance with an aspect of the present disclosure.
Figure 19:
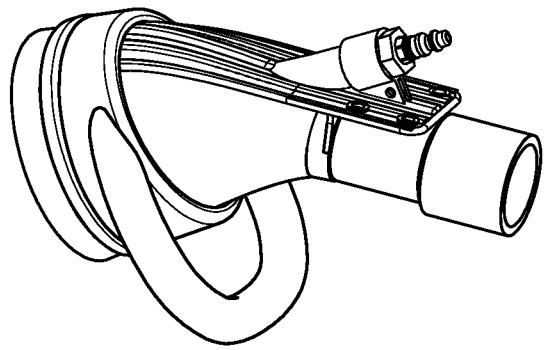
FIG. 19 illustrates another example of a grip for use with a cleaning apparatus in accordance with an aspect of the present disclosure.
Figure 20:
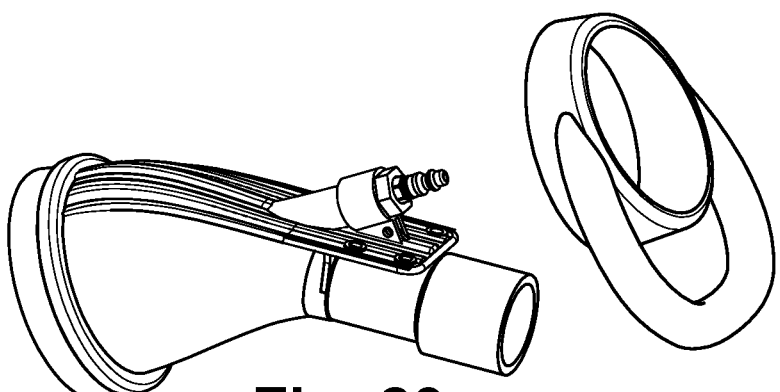
FIG. 20 illustrates the example grip of FIG. 19 in a removed state in accordance with an aspect of the present disclosure.
Figure 21:
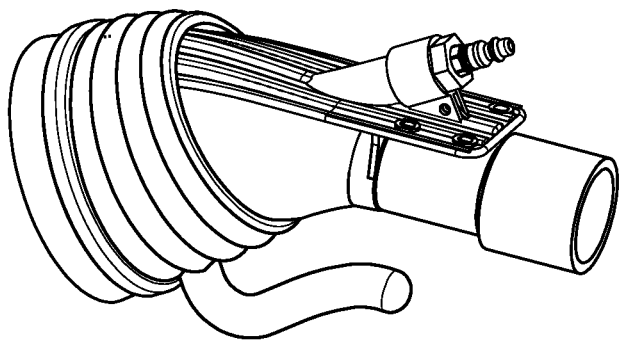
FIG. 21 illustrates another example of a grip for use with a cleaning apparatus in accordance with an aspect of the present disclosure.
Figure 22:
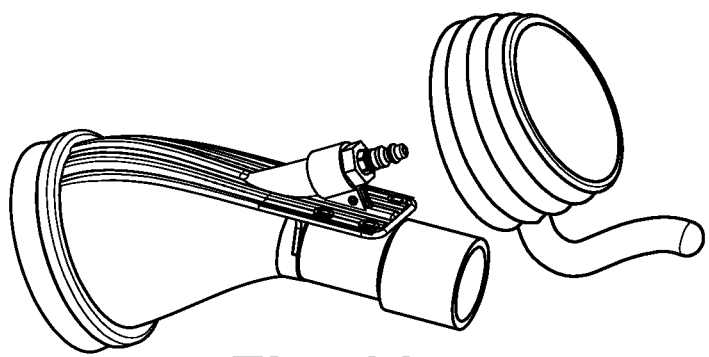
FIG. 22 illustrates the example grip of FIG. 21 in a removed state in accordance with an aspect of the present disclosure.
Figure 23:
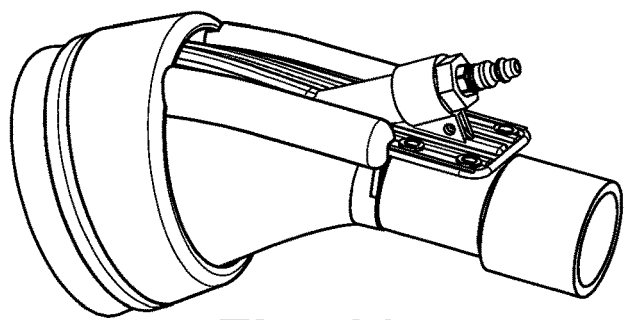
FIG. 23 illustrates another example of a grip for use with a cleaning apparatus in accordance with an aspect of the present disclosure.
Figure 24:
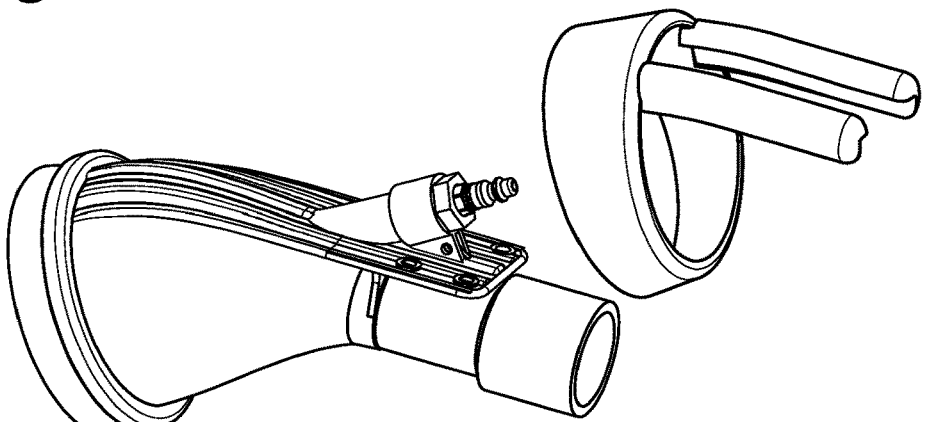
FIG. 24 illustrates the example grip of FIG. 23 in a removed state in accordance with an aspect of the present disclosure.
Figure 25:
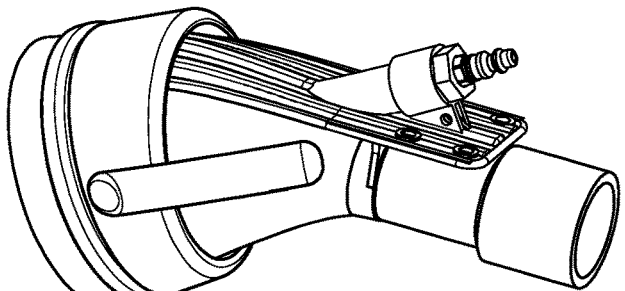
FIG. 25 illustrates another example of a grip for use with a cleaning apparatus in accordance with an aspect of the present disclosure.
Figure 26:
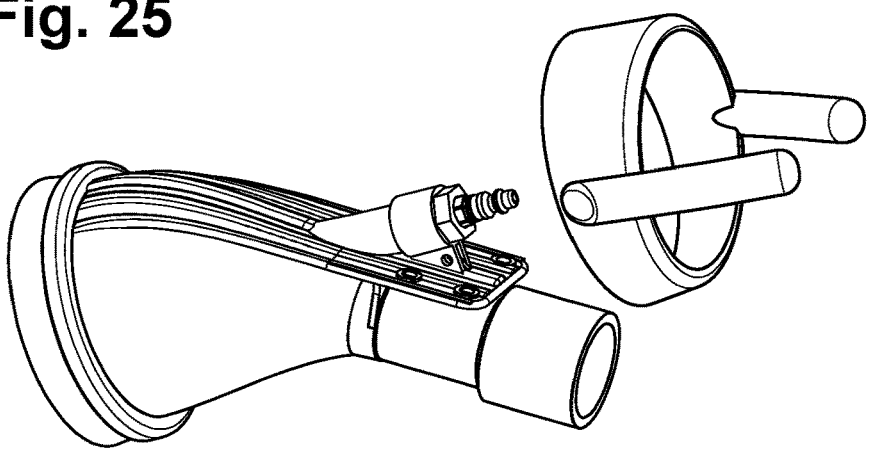
FIG. 26 illustrates the example grip of FIG. 25 in a removed state in accordance with an aspect of the present disclosure.

During operation, the cleaning apparatus 500 does not make contact with the interior surfaces to be cleaned. One or more sensors can be incorporated into the cleaning apparatus 500 to facilitate motion and path planning. The sensor(s) can include one or more of force sensors, proximity sensors, speed/acceleration sensors or the like and can be coupled to any desirable portion of the housing, such as within an internal portion of housing 510. The sensor(s) can control the cleaning apparatus 500 such that the sprayer nozzles 600 are maintained at a predetermined distance, such as 0.5-1.0 inches from the surfaces to be cleaned. The sprayer device pressure and/or volume can be remotely actuated and controlled based on sensor feedback and/or in conjunction with centralized or localized path planning and motion control software. Depending on the surface to be cleaned, the cleaning apparatus 500 can be supplied with one or more predetermined cleaning media. For example, for cleaning a dashboard, console, instrument panel cluster, and door panel, the cleaning apparatus 500 can be fed with air, air and water, or air and cleaning fluid. Air can be fed through the supply lines 590 and the water and/or cleaning fluid can be supplied via one or more fluid lines (not shown) and fitting 640 coupled to a side of the manifold 560. For drying door frames and jambs, the cleaning apparatus 500 can be configured to use air only. Each of these modes can be automatically controllable by the robotic software control system based on programmed workflows. In addition to attaching easily to the end of a robot arm using conventional end effector fixturing, the cleaning apparatuses described herein can be held by hand and manipulated manually, as well. For instance, the housing can include an ergonomic grip or handle formed integrally with an exterior portion of the housing. Alternatively, the cleaning apparatus can be fitted with a removable ergonomic grip or handle to allow for manual use when desired. To facilitate use of the cleaning apparatus by hand, an on/off switch may be provided on the device as well as a manually adjustable vent for reducing the suction pressure, making manual manipulation of the apparatus easier. FIGS. 16-26 illustrate various grips and/or handles that can be secured to a housing of a cleaning apparatus. As shown, grip designs for the example cleaning apparatuses illustrated in FIGS. 1-9 include a general ring-shaped configuration with an interior diameter that corresponds to an exterior diameter of the cleaning apparatus housing to provide a snug and secure fit between the grip and the housing. Thus, the grip can be fit over a second end portion of the housing and slid towards a first end portion until the grip is securely in position. However, the grip(s) can be secured to the housing in any desired manner, such as via a snap fit connection and/or secured via one or more fasteners. The grip may include at least one of: one or more finger loops, as shown in FIG. 16; one or more concave grooves, as shown in FIG. 17; one or more convex rings, as shown in FIG. 18; a c-shaped handle loop, which can be positioned below the housing body, as shown in FIG. 19 or can be rotated and positioned above the housing body; a grip having a projection for supporting a backside of a user's hand in position, which can be positioned below the housing body, as shown in FIG. 21 or can be rotated and positioned above or to one side of the housing body; a pair of handle grips, which can be positioned near a top portion of the housing, as shown in FIG. 23 or on opposing sides of the housing, as shown in FIG. 26. Thus, as shown, the grip and/or handle can be of any suitable form to facilitate manual operation of a cleaning apparatus. The same or similar grip and/or handle configurations can be adapted for use with the multi-head sprayer cleaning apparatus.

From the foregoing, it will be appreciated that various embodiments of the present disclosure have been described herein for purposes of illustration, and that various modifications may be made without departing from the scope and spirit of the present disclosure. As an example, while described in the context of interior vehicle cleaning, it is to be appreciated that the cleaning apparatus can be utilized in a plurality of different applications, such as a street sweeping application, for example. Accordingly, the various embodiments disclosed herein are not intended to be limiting.

The invention claimed is:

1. A cleaning apparatus comprising:
a housing comprising:
a first end portion having an open end; and
a second end portion including a first port configured for connection to a vacuum device and in fluid communication with the open end such that a suction created by the vacuum device can pull debris through the open end and into the first port;
a nozzle positioned within the housing and configured to expel fluid out from the open end, the nozzle being movable relative to the housing; and
a dust skirt coupled to the open end of the housing,
wherein the nozzle expels fluid while the suction simultaneously pulls debris into the first port, a radial distance between the nozzle and adjacent wall of the housing being at least one-half inch, the adjacent wall being defined as a wall in proximity to the first port,
wherein a space between the nozzle and the adjacent wall of the housing is unobstructed and an interior of the housing is configured such that during suction, the debris can move along an unobstructed path to the first port,
wherein the nozzle is recessed within the housing to a depth such that a diameter of the fluid expelled from the nozzle is approximately equal to a diameter of the open end of the housing; and
a flange coupled to the housing and configured for connection to a robotic arm, the flange extending from the open end of the housing to a distal end and having strengthening ribs, at least one aperture, and wherein an inlet to the nozzle for pressurized air extends through the flange.

2. The cleaning apparatus of claim 1, wherein the radial distance between the nozzle and the adjacent wall of the housing is approximately equal to or greater than 1.0 inch.

3. The cleaning apparatus of claim 2, wherein a diameter of the open end is approximately twice a size of a diameter of the first port.

4. The cleaning apparatus of claim 1, wherein the housing includes a non-rigid material or a rigid material with a non-marking skin.

5. The cleaning apparatus of claim 1, further comprising a rotary brush head.

6. The cleaning apparatus of claim 1, wherein the housing configuration includes one of a bowl-shaped, cup-shaped, or bell-shaped portion, the nozzle extending through a central portion of the bowl-shaped, cup-shaped, or bell-shaped portion.

7. The cleaning apparatus of claim 1, wherein a center of mass of the cleaning apparatus lies above and within a perimeter of the open end of the housing when positioned with the open end of the housing facing and generally parallel to a surface being cleaned.

8. The cleaning apparatus of claim 1, further comprising a plurality of sensors coupled to the housing and configured to sense a proximity of the housing to a surface.

9. The cleaning apparatus of claim 1, the housing further comprising an adjustable vent configured to change a suction pressure through the housing.

10. The cleaning apparatus of claim 1, wherein the configuration allows for touchless cleaning of a surface during the suction operation created by the vacuum device.

11. The cleaning apparatus of claim 10, further comprising a rotary brush extending from an open end of the housing.

12. The cleaning apparatus of claim 1, wherein the nozzle is movable relative to the housing in a corkscrew pattern or to whip or oscillate in an erratic manner.

13. A cleaning apparatus comprising:
a housing having a substantially hollow main body and a first port for connection to a vacuum device;
a nozzle coupled to the housing and configured to expel pressurized air from an open end of the housing wherein a diameter of an air path created by the nozzle is approximately equal to the diameter of the open end of the housing; positioned within the substantially hollow main body;
at least one sensor coupled to the housing and configured to sense at least one of proximity of the housing to a surface or contact by the housing with a surface;
a flange coupled to the housing and configured for connection to a robotic arm, the flange extending from the open end of the housing to a distal end and having strengthening ribs, at least one aperture, and wherein an inlet for the nozzle for pressurized air extends through the flange; and
a dust skirt coupled to the open end of the housing,
wherein the substantially hollow main body is configured such that a hollow portion of the main body creates a crush zone configured to absorb shock upon impact of the housing with an object and minimize shock transferred to the connection portion.

14. The cleaning apparatus of claim 13, wherein the substantially hollow main body includes an open end with no obstructed paths between the open end to the first port.

15. The cleaning apparatus of claim 13, further comprising a dust skirt channel provided at an open end of the substantially hollow main body; and the dust skirt secured within the dust skirt channel.

16. The cleaning apparatus of claim 13, further comprising the at least one sensor configured to sense the proximity of the housing to the surface.

17. The cleaning apparatus of claim 13, wherein the housing further comprising a first shell and a second shell that define the hollow portion.

18. A cleaning apparatus comprising:
a housing configured for touchless cleaning of a surface, the housing including a main body portion having a rear section and a front section, the front section having an open end and a dust skirt coupled to the open end;
a first port opening into the rear section of the main body portion and in fluid communication with the open end and a vacuum source;
a second port opening into the main body portion and in fluid communication with the open end and a fluid source;
a nozzle coupled to the fluid source and recessed entirely within the open end of the main body portion;
a dust skirt coupled to the open end of the housing; and
at least one sensor positioned within the housing and configured to sense a pressure of the dust skirt when in contact with the surface,
wherein a depth of the nozzle within the main body portion is adjustable to modify a circumference of the surface affected during cleaning,
wherein during a cleaning operation, the housing is held in a spaced apart relation to a surface being cleaned.

19. The cleaning apparatus of claim 18, wherein the housing includes a connection portion for connection to a robotic device.

20. The cleaning apparatus of claim 19, wherein the housing is configured with a crush zone.

21. The cleaning apparatus of claim 18, wherein a radial distance between the nozzle and an adjacent wall of the housing being approximately equal to or greater than 1.0 inch.

22. The cleaning apparatus of claim 18, wherein during use a center of mass is above and within the perimeter of the open end of the housing when the open end of the housing is facing the surface being cleaned.

* * * * *